United States Patent [19]

Kusano et al.

[11] Patent Number: 5,425,832
[45] Date of Patent: Jun. 20, 1995

[54] SURFACE TREATMENT OF FLUOROPOLYMER MEMBERS AND PREPARATION OF COMPOSITE PRODUCTS THEREFROM

[75] Inventors: Yukihiro Kusano, Tokorozawa; Masato Yoshikawa, Kodaira; Itsuo Tanuma; Yukio Fukuura, both of Sayama; Kazuo Naito, Kawasaki; Yasuhiro Morimura, Kodaira; Satiko Okazaki, 20-11, Takaido Higashi 2-chome, Suginami-ku, Tokyo; Masuhiro Kogoma, 843-15, Shimoniikura, Wakou-shi, Saitama-ken, all of Japan

[73] Assignees: Bridgestone Corporation, Tokyo; Satiko Okazaki, Suginami; Masuhiro Kogoma, Saitama, all of Japan

[21] Appl. No.: 969,589

[22] Filed: Oct. 30, 1992

Related U.S. Application Data

[63] Continuation-in-part of Ser. No. 769,732, Oct. 2, 1991.

[30] Foreign Application Priority Data

| Oct. 5, 1990 | [JP] | Japan | 2-266392 |
| Apr. 12, 1991 | [JP] | Japan | 3-108471 |
| Apr. 12, 1991 | [JP] | Japan | 3-108472 |

[51] Int. Cl.[6] .................................. B32B 31/00
[52] U.S. Cl. ........................... 156/272.6; 156/275.7; 156/331.1; 156/331.7; 156/334; 156/335; 156/338
[58] Field of Search .............. 428/421, 422; 156/272.6, 281, 275.7, 331.1, 331.7, 334, 335, 338; 427/491, 533–536, 569

[56] References Cited

U.S. PATENT DOCUMENTS

| 4,339,565 | 7/1982 | Tomoda | 528/27 |
| 4,394,205 | 7/1983 | Blenner | 156/307.3 |
| 4,465,547 | 8/1984 | Belke, Jr. et al. | |
| 4,588,642 | 5/1986 | Ochiumi | 428/421 |
| 4,606,952 | 8/1986 | Sugimoto et al. | 428/421 |
| 4,743,327 | 5/1988 | DeHaan et al. | 156/272.6 |
| 4,765,860 | 8/1988 | Ueno et al. | 156/272.6 |
| 4,785,666 | 11/1988 | Bergquist | 73/40.7 |
| 5,041,304 | 8/1991 | Kusano et al. | 427/41 |
| 5,093,166 | 3/1992 | Nishimura | 428/421 |
| 5,185,132 | 2/1993 | Horike et al. | 422/186.05 |
| 5,188,904 | 2/1993 | Graves | 427/387 |
| 5,225,659 | 7/1993 | Kusano et al. | 249/121.59 |
| 5,246,782 | 9/1993 | Kennedy et al. | 428/421 |

FOREIGN PATENT DOCUMENTS

| 0057374 | 8/1982 | European Pat. Off. | |
| 0185590 | 6/1986 | European Pat. Off. | |
| 0479592 | 4/1992 | European Pat. Off. | 156/272.6 |
| 890466 | 2/1962 | United Kingdom | |

OTHER PUBLICATIONS

Journal of Applied Polymer Science, vol. 16, pp. 1465–1477, (1972) "Effect of Activated Gas Plasma Treatment Time on Adhesive Bondability of Polymers", Hall et al.

*Primary Examiner*—Chester T. Barry
*Attorney, Agent, or Firm*—Birch, Stewart, Kolasch & Birch

[57] ABSTRACT

Tightly integrated composite products are obtained by treating a fluoropolymer member on its surface with atmospheric pressure glow discharge plasma in a helium gas atmosphere containing 97% by volume or more of helium gas, and joining another member of rubber compositions, resins, metals, ceramics, or semiconductors to the surface treated fluoropolymer member. By using a fluoropolymer sheet as the fluoropolymer member and a metal or synthetic resin layer as the other member, there are obtained weather-resistant composite sheets in which the layer is firmly bonded to the fluoropolymer sheet.

12 Claims, 4 Drawing Sheets

SURFACE TREATMENT OF FLUOROPOLYMER MEMBERS AND PREPARATION OF COMPOSITE PRODUCTS THEREFROM

CROSS REFERENCE TO RELATED APPLICATION

This application is a continuation-in-part of application Ser. No. 07/769,732 filed on Oct. 2, 1991, the entire contents of which are hereby incorporated by reference.

This invention relates to a method for surface treating fluoropolymer members with atmospheric pressure glow discharge plasma to render the surface hydrophilic and a method for joining fluorochemical members to other members to form composite products.

BACKGROUND OF THE INVENTION

Fluoropolymer members of fluoroplastic resins and analogues are of great interest for their mechanical properties and resistance against heat, weather, and chemicals. Since fluoroplastic resins are very expensive, they are often used as thin film sheets which are joined to supports of less expensive material which are responsible for air tightness and strength. Typical of such composite products are weather-resistant sheets.

Fluoropolymer members of fluoroplastic resins and analogues, however, are difficult to form composite products because they are difficultly adhesive due to their characteristic chemical stability. Efforts have heretofore been made for rendering the surface of fluoropolymer members hydrophilic for improving their adhesiveness. Prior art approaches include mechanical roughening, chemical etching, sputtering, flame treatment, and plasma or corona discharge treatment on the surface of fluoroplastic resin sheets. None of these approaches have gained sufficient bond strength.

Among the conventional approaches, the plasma surface treatment is an attractive surface treatment method for fluoropolymer members since it is clean and offers a high degree of freedom for surface modification. Usually, fluoropolymer members such as fluororesin sheets are modified by plasma discharge treatment to provide a hydrophilic surface suitable for adhesion. This treatment is often carried out in a gas atmosphere containing oxygen, argon or nitrogen or a gas mixture of oxygen and carbon tetrafluoride. The conventional plasma discharge treatment under such atmospheres, however, could not render the fluoropolymer member surface fully hydrophilic, thus failing to achieve satisfactory adhesion.

Another known method for obtaining hydrophilic fluoropolymer member surfaces is a low-pressure glow discharge process using helium gas as disclosed in J. R. Hall, C. A. L. Westerdahl et al, J. Appl. Polym. Sci., 16, 1465 (1975). The method could render fluoropolymer member surfaces hydrophilic, but not to an extent enough for adhesion, and the method remained practically unacceptable.

In addition, since low-pressure glow discharge plasma is generally carried under low pressures of less than about 10 Torr, this method requires a vacuum apparatus of a high capacity for commercial application, entailing increases in investment and operating cost. If objects to be treated contain much moisture and volatile plasticizers, these components would vaporize and leave the object surface in a vacuum atmosphere, disturbing the plasma treatment from achieving the intended function. Moreover, the plasma treatment of this type tends to produce heat and is thus undesirable to apply to articles of low-melting materials.

A commercially acceptable mode of corona discharge treatment also improves adhesion, but to an unsatisfactory level.

SUMMARY OF THE INVENTION

Therefore, an object of the present invention is to provide a method for modifying a surface of a fluoropolymer member optimum for adhesion by treating the surface with plasma discharge to be fully hydrophilic. Another object of the present invention is to provide a method for forming a composite product by joining a surface-modified fluoropolymer member to another member.

As opposed to the prior art belief that the atmosphere gases commonly used in plasma discharge treatment for imparting hydrophilic nature are applicable to the treatment of fluoropolymer members for imparting hydrophilic nature to their surfaces, we have found that by using a helium gas atmosphere and an atmospheric pressure glow discharge plasma process, fluoropolymer members which are otherwise substantially unbondable can be rendered on the surface hydrophilic enough to provide a firm bond to other members. Then fluoropolymer members having their surface modified to be bondable can be joined to other members of rubber compositions, resins, metals, ceramics, or semiconductors to achieve a firm bond therebetween. For joining purposes, silane and aminosilane coupling agents are adequate adhesives.

It is often desired to join such a surface-modified fluoropolymer compositions based on NBR (acrylonitrile-butadiene rubber), it is preferred to use urethane, NBR phenol, Modified NBR phenol, aminosilane and butyl adhesives because an enhanced bonding force is obtained. For rubber compositions based on IIR (isobutylene-isoprene rubber), it is preferred to use butyl adhesives because an enhanced bonding force is obtained.

One class of commonly used fluoropolymer members is fluoropolymer-containing sheets including sheets of fluoropolymers and sheets of fluoropolymer and other synthetic resin blends. When metal layers (such as metal foil) or layers of synthetic resins other than fluoropolymers are formed thereon with or without intervening adhesive, there are obtained weather-resistant composite sheets in which a firm bond is achieved between the fluoropolymer-containing sheets and the metal or synthetic resin layer so that the respective components can exert their own nature to the full extent. Since the atmospheric pressure glow discharge plasma process does not need a complicated apparatus, the entire procedure is cost effective for manufacturing weather-resistant composite sheets using fluoropolymer-containing sheets.

Therefore, a first aspect of the present invention is a method for surface treating a fluoropolymer member comprising the step of treating a surface of the fluoropolymer member with atmospheric pressure glow discharge plasma in a helium gas atmosphere containing 97% by volume or more by helium gas. A second aspect of the present invention is a method for forming a composite product from a fluoropolymer member by joining another member selected from the group consisting of rubber compositions, resins, metals, ceramics, and semiconductors to the surface-treated fluoropolymer member.

In one preferred embodiment, the other member is joined to the fluoropolymer member with an adhesive in the form of a silane coupling agent and/or aminosilane coupling agent. Where the other member is of a rubber composition based on a NBR rubber, it is joined to the surface-treated fluoropolymer member with a urethane, NBR phenol, modified NBR phenol, aminosilane or butyl adhesive. Where the other member is of a rubber composition based on a IIR rubber, it is joined to the surface-treated fluoropolymer member with a butyl adhesive.

In a further form of the invention a fluoropolymer-containing sheet on a surface thereof is treated with atmospheric pressure glow discharge plasma in a helium gas atmosphere containing 97% by volume or more of helium gas. A metal layer or a layer of synthetic resin other than the fluoropolymer is bonded to the plasma-treated surface of the fluoropolymer-containing sheet, optionally with an adhesive.

DETAILED DESCRIPTION OF THE INVENTION

Figure 1:
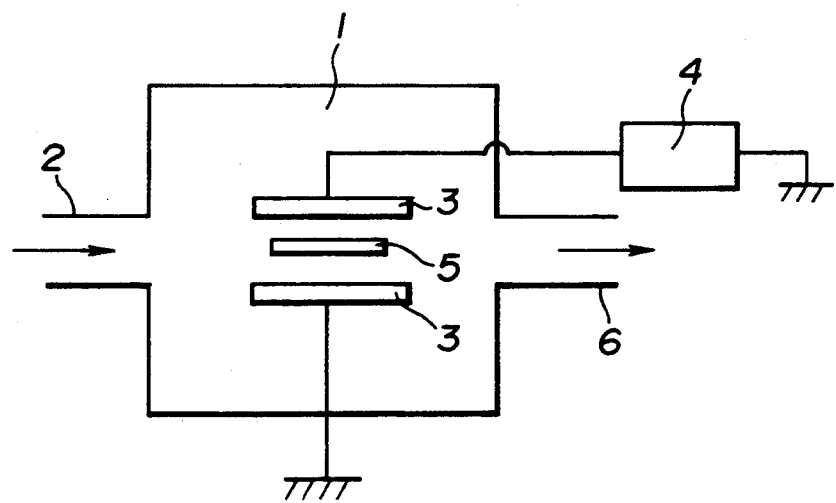
FIG. 1 is a schematic view of an atmospheric pressure glow plasma discharging apparatus.

The fluoropolymer members which can be surface treated according to the present invention are formed of fluoropolymer materials, that is, materials containing a fluorine atom or atoms in a molecule. Typical are fluorocarbons or fluororesins, for example, polytetrafluoroethylene (PTFE), perfluoroalkoxyfluororesins, tetrafluorinated ethylene-hexafluorinated propylene copolymers (FEP), ethylene-tetrafluorinated ethylene copolymers (ETFE), poly(chlorotrifluoroethylene) (PCTFE), polyvinylidene fluoride (PVDF), and polyvinyl fluoride (PVF) resins as well as fluororubbers.

Also included are blends of fluororesins with other (fluorine-free) synthetic resins, for example, polyethylene(meth)acrylate copolymers, poly(meth)acrylates, polyvinyl chloride, polyethylene terephthalate, polybutylene terephthalate, polyamides, polyvinyl acetate, polyvinylidene chloride, polycarbonates, poly(4-methyl-1-pentene), poly(cis-1,2-butadiene), acrylonitrile-butadiene-styrene copolymers, and ethylene-propylene copolymers. The amounts of synthetic resins blended with fluororesins may be determined in accordance with the desired physical properties of the member, although 0 to 10,000 parts, preferably 0 to 1,000 parts, more preferably 0 to 100 parts, most preferably 0 to 50 parts by weight of the synthetic resins may be blended to 100 parts by weight of fluororesins.

The fluoropolymer members may have any desired shape, for example, plate, sheet, cylinder, column, fiber, and block shapes.

The surface treating method of the invention is to treat a surface of the fluoropolymer member with atmospheric pressure glow discharge plasma in a helium gas atmosphere containing at least 97% by volume, preferably at least 98% by volume of helium gas. The remaining gas in the atmosphere may be $O_2$, $N_2$, $H_2O$, $CO_2$, CO, $O_3$, etc.

In general, "glow discharge" (uniform discharge applicable to surface treatment) is defined as occurring under reduced pressure while all the discharges which can be created under atmospheric pressure are nonuniform discharges at high temperatures, such as arc discharge, corona discharge and spark discharge. That is, the concept of a glow discharge under atmospheric pressure was not recognized. It was found that a glow discharge plasma under atmospheric pressure can be created in selected conditions as disclosed in Japanese Patent Application Kokai No. 306569/1989, and 15171/1990. The atmospheric pressure glow discharge plasma process takes place at pressure near or at an atmospheric pressure in a range of 100 to 2,000 Torr, more preferably at about 760 Torr, does not need a vacuum apparatus of high capacity, is applicable to members having relatively high contents of water and volatile plasticizers, produces little heat during operation and is thus applicable to low-melting material members. It also allows for localized treatment so that only a selected area of a member may be treated. Except that the atmosphere should be helium gas, the treating conditions may be selected from well-known parameters as will be described later.

Atmospheric pressure glow discharge plasma may be produced by any desired method which can generate a glow discharge plasma under atmospheric pressure and thereby induce reaction on the object surface. Voltage application is generally classified into DC and AC modes, with the AC mode being advantageous for commercial purposes. Generally, voltage application in either mode requires a pair of electrode, one for high voltage and one for grounding.

The AC discharge is further classified in terms of frequency or wavelength into low frequency, high frequency, and microwave. In the case of low frequency discharge, the electrodes used in producing atmospheric pressure glow discharge plasma include electrodes of capacity and coil types. For an internal electrode mode, it is recommended to coat one or both of the electrodes with insulator since a stable atmospheric pressure glow discharge plasma is readily available. An external electrode mode may be employed if the treating chamber is formed of glass or similar insulator. The high frequency discharge may also employ an internal electrode mode as used for the low frequency discharge and an external electrode mode as well as coil type discharge. In the case of microwave discharge, a waveguide mode of discharge is useful.

In the case of DC discharge, for creating and stabilizing a DC glow discharge with electrons directly fed from the electrode, it is recommended not to coat the high voltage applying and grounding electrodes with insulator.

In the practice of the present invention, surface treatment may be carried out by placing an object to be treated, which is a fluoropolymer member, in a treating chamber where a plasma discharge zone is formed by the above-mentioned technique while helium gas is supplied to the chamber.

Referring to FIG. 1, there is illustrated one exemplary apparatus for carrying out surface treatment according to the invention. The apparatus includes a treating chamber 1, a helium inlet tube 2 connected to the chamber, a pair of opposed electrodes 3, 3 spaced a predetermined distance in the chamber, one electrode being connected to a power supply 4 and the other electrode being grounded, and a gas outlet tube 6 connected to the chamber on a side opposite to the inlet tube. An object to be treated 5 is disposed between the electrodes 3, 3.

Figure 2:
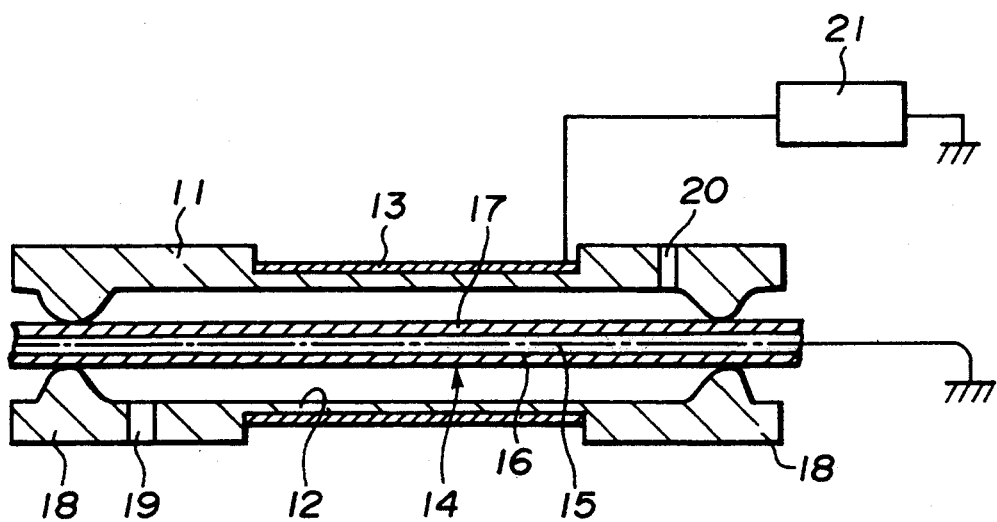
FIG. 2 is a cross sectional view of another exemplary apparatus used in the practice of the present invention.
Figure 3:
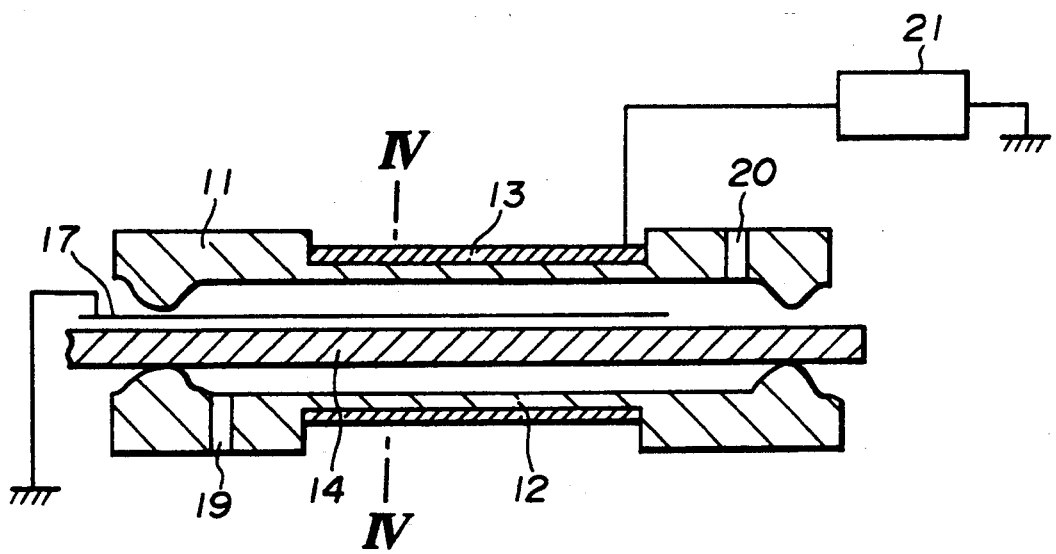
FIG. 3 is a cross sectional view of a further exemplary apparatus used in the practice of the present invention.

FIGS. 2 and 3 show different embodiments of the treating apparatus which may be used when the fluoropolymer member has an axisymmetric shape such as tube, rod, and fiber shapes.

FIG. 2 shows an apparatus suitable for the treatment of a tubular object (fluoropolymer member) which employs an annular electrode and a conductive core coated with a fluoropolymer member as a counter electrode. The apparatus includes a cylindrical housing of insulating material 11 having a central thin walled section 12 and inwardly protruding annular supports 18 disposed at axially opposed ends of the housing. An annular electrode 13 is sleeved over the housing central section 12 so that the inner surface of the annular electrode 13 is insulated by the insulator 12. An article 14 in the form of a conducive core 15 covered over the outer periphery with a tubular member 16 to be treated (fluoropolymer member) is substantially coaxially disposed in the housing 11. More particularly, the article 14 is supported by the annular supports 18. The housing 11 is provided with gas inlet and outlet ports 19 and 20 inside the annular supports 18. The annular electrode 13 is connected to an AC power supply 21. The core 15 serves as a counter electrode 17 which is grounded.

The apparatus of FIG. 2 is of simple structure in that the article to be treated 14 (that is, the conductive core 15 covered with the object to be treated 16) serves as a counter electrode. Between the annular electrode 13 and the counter electrode 17 is produced an atmospheric pressure glow discharge plasma region uniformly surrounding the article to be treated 14. Then the article 14 is uniformly treated on the outer surface.

Figure 4:
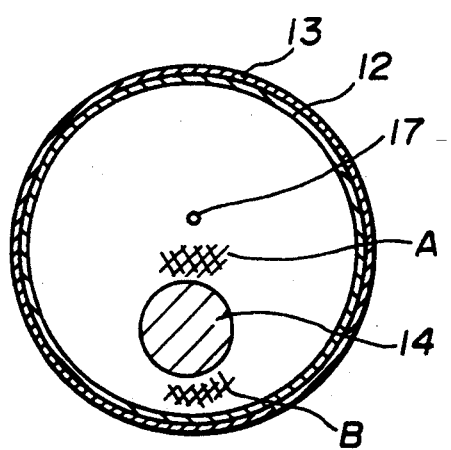
FIG. 4 is a cross sectional view taken along lines IV—IV in FIG. 3.

FIG. 3 shows an apparatus suitable for the treatment of a rod-shaped object (fluoropolymer member). The embodiment of FIG. 3 is substantially the same as FIG. 2 except that instead of the conductive core covered with an object to be treated serving as a counter electrode, a counter electrode in the form of a wire 17 is extended along an object to be treated 14. As seen from FIG. 4, the wire electrode 17 is spaced apart from the object 14. When an atmospheric pressure glow discharge plasma is produced, shadow zones A and B are formed by the object 14 itself between the electrodes 13 and 17 if the object 14 has a much larger diameter than the counter electrode 17. It was found that the glow discharge plasma region extends throughout the shadow zones A and B. Therefore, the object 14 is subject to uniform glow discharge plasma treatment over the outer surface.

Figure 5:
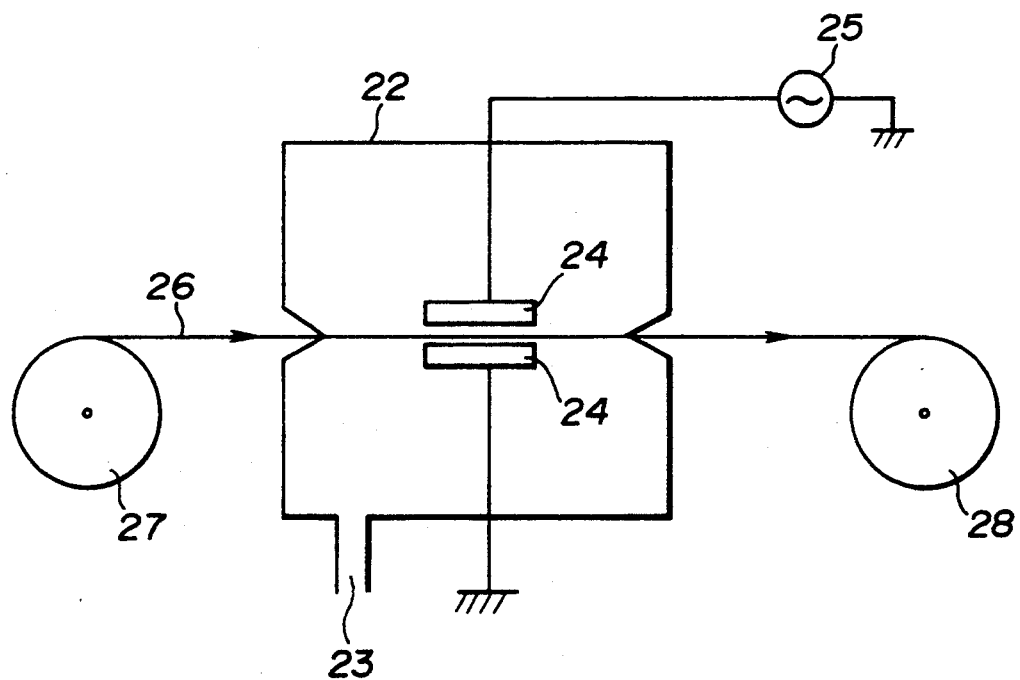
FIG. 5 is a schematic view of a still further exemplary atmospheric pressure glow plasma discharging apparatus.

A still further preferred embodiment of the apparatus used in the surface treatment in accordance with the invention is shown in FIG. 5. The embodiment of FIG. 5 is obtained by modifying the embodiment of FIG. 1 such that an object to be treated is continuously passed through the plasma region. The apparatus includes a treating chamber 22, a helium gas inlet tube 23 connected to the chamber, and a pair of insulator-coated electrodes 24, 24 spaced a predetermined distance in the chamber, one electrode being connected to a power supply 25 and the other electrode being grounded. A sheet to be treated 26 is continuously moved from a supply roll 27 to a take-up roll 28 while it is passed between the electrodes 24 and 24 where it is subject to surface treatment.

After surface treatment with atmospheric pressure glow discharge plasma in this way, the fluoropolymer member has a highly hydrophilic surface which can be readily joined to another member for integration by well-known means such as heating, pressing, and heat pressing.

The other members to be joined to the fluoropolymer members are of any desired materials including rubber compositions, resins, matals, ceramics, and semiconductors and may take any desired shape such as plate, sheet, cylinder, column, fiber and block shapes.

Adhesives are generally used for joinder purposes. A suitable adhesive may be selected from silane coupling agents, aminosilane coupling agents, epoxy adhesives, urethane adhesives, phenol adhesives, NBR phenol adhesives, acrylic adhesives, and rubber adhesives, depending on the type and surface state of the other material to be joined, the bonding method and other factors. Silane coupling agents and aminosilane coupling agents are preferred adhesives. For some materials or conditions, a direct joinder can be accomplished without adhesive.

When the fluoropolymer members are joined to rubber compositions to form rubbery composite materials, any well-known rubber compositions may be used. Various well-known rubber bases may be used although acrylonitrile-butadiene rubber (NBR) and isobutylene-isoprene rubber (IIR) bases are preferred.

In joining rubber compositions to the surface-treated fluoropolymer members, it is possible to form a direct bond therebetween without adhesive if a particular type of rubber composition or a particular set of bonding conditions is selected. In most cases, however, adhesives are used. A suitable adhesive may be selected from the above-mentioned adhesives, depending on the type and surface state of the rubber composition to be joined, the bonding method and other factors. When a rubber composition based on a NBR rubber is joined to the fluoropolymer member, the adhesive is preferably selected form urethane, NBR-phenol, modified NBR-phenol, aminosilane and butyl adhesives, with the urethane and NBR-phenol adhesives being most preferred. When a rubber composition based on a IIR rubber is joined to the fluorochemical member, a butyl adhesive is preferred.

Bonding may be achieved by conventional techniques, for example, by placing a rubber composition on a surface-treated fluoropolymer member often through an adhesive layer, and applying pressure and/or heat or vulcanizing the rubber.

The fluoropolymer member/rubber composite materials thus produced are useful in the manufacture of various parts such as automobile gasoline hoses and conveyor belts.

It is also possible to apply and bond layers of metal or synthetic resin other than fluoropolymers to the surface-treated fluoropolymer members. The metal layers may be metal foils of at least 10 μm thick of aluminum, copper, iron, plated copper, stainless steel, brass or the like. The synthetic resin layers may be resin sheets of polyethylene terephthalate, polybutylene terephthalate, polyamides, poly(meth)acrylate, polyvinyl chloride, polycarbonates, polyethylene, polypropylene or the like. Most often, aluminum foil is used for its air-tightness, economy, ease of processing and other advantages. These foils and sheets play the role of imparting strength, air-tightness and other properties to the composite products instead of the fluoropolymer members even when the fluoropolymer members are as thin as 10 to 10000 μm. Since the surface of fluoropolymer members has gained a high degree of hydrophilic nature through the plasma treatment, the fluoropolymer members can be readily bonded to the foils or sheets into composite products by well-known bonding means, for example, heating, pressing, and heat pressing.

In joining metal or synthetic resin layers to the surface-treated fluoropolymer members, it is possible to form a direct bond therebetween without adhesive if a particular type of material or a particular set of surface treating or bonding conditions is selected. In most cases, however, adhesives are used. A suitable adhesive may be selected from epoxy adhesives, urethane adhesives, phenol adhesives, NBR phenol adhesives, acrylic adhesives, and rubber adhesives, depending on the type and surface state of the layer to be joined, the bonding method and other factors.

In this way, a fluoropolymer member having a surface treated with atmospheric pressure glow discharge plasma is joined to another sheet to form a weather-resistant composite sheet in which both the components are firmly bonded and integrated to each other.

EXAMPLE

Examples of the present invention are given below together with comparative examples by way of illustration and not by way of limitation.

Example 1 & Comparative Examples 1–4

Using the plasma treating apparatus of FIG. 1, strips of fluororesin film (ETFE: tetrafluoroethylene-ethylene copolymer) were treated on their surface under the conditions shown in Table 1. Comparative Examples 1 and 2 are prior art known methods for imparting hydrophilic nature to a surface of organic material. Comparative Example 3 is a prior art known method for imparting hydrophilic nature to a surface of fluoropolymer material by low-pressure glow discharge plasma. Comparative Example 4 is a control sample on which no surface treatment was done.

The treated strips of Example 1 and Comparative Examples 1–4 were examined for degree of surface treatment by measuring a contact angle of a water droplet. Smaller contact angles with water mean that surface-treated members have higher degrees of hydrophilic nature. The measurements of contact angle are reported in Table 1.

Next, the treated fluororesin strips were adhesively joined to rubber pieces by heat pressing, for examining adhesiveness.

Two adhesives were used. Adhesive A is an aminosilane coupling agent diluted with methanol by a volume factor of 20. Adhesive B is a urethane adhesive, Desmodur R (manufactured by Bayer AG) diluted with methylene chloride by a volume factor of 3. The rubber pieces used had the following composition.

| Rubber composition A | Parts by weight |
|---|---|
| NBR (N230S by Japan Synthetic Rubber K.K.) | 100 |
| Carbon black | 30 |
| Zinc white | 2 |
| Antioxidant 1) | 1.5 |
| Vulcanization promoter 2) | 0.5 |
| Vegetable oil or mineral oil | 10 |

1) polymerized 2,2,4 - trimethyl - 1,2 - dihydroquinoline
2) tetramethylthiuram disulfite Fluororesin strips both before and after the above-mentioned surface treatment were coated with the adhesives by dipping and air drying. Then rubber pieces were laid on the strips and vulcanized to the strips by heat pressing at 150° C. for 45 minutes.

The fluororesin/rubber composite samples were allowed to stand in a constant temperature chamber at 120° C. for 24 hours for heat aging. The composite samples both before and after the heat aging test was subject to a stripping test by stripping the rubber pieces from the fluororesin strips. The percent area of rubber remainder on the fluororesin strip after the test was determined and reported as rubber adhesion. The proportion of cohesive failure of rubber was examined in this way.

The results are shown in Table 1.

TABLE 1

| | Example 1 | Comparative Example 1 | Comparative Example 2 | Comparative Example 3 | Comparative Example 4 |
|---|---|---|---|---|---|
| Type of discharge | APGP | APGP | corona | LPGP | — |
| Pressure, Torr | 760 | 760 | 760 | 0.3 | — |
| Frequency, kHz | 3 | 3 | 15 | $1.356 \times 10^4$ | — |
| Treating time, sec. | 60 | 60 | 60 | 60 | — |
| Gas | He (99%) | He/O$_2$ (20/1) | air | He (99%) | — |
| Contact angle, ° Adhesive A | 38.8 | 61.6 | 80.2 | 50.0 | 99.2 |
| Rubber adhesion, % Before heat aging | 30 | 5 | 5 | 20 | 0 |
| Rubber adhesion, % After heat aging | 60 | 5 | 10 | 40 | 0 |

TABLE 1-continued

|  | Example 1 | Comparative Example 1 | Comparative Example 2 | Comparative Example 3 | Comparative Example 4 |
|---|---|---|---|---|---|
| Adhesive B |  |  |  |  |  |
| Rubber adhesion, % Before heat aging | 100 | 15 | 0 | 50 | 0 |
| Rubber adhesion, % After heat aging | 100 | 5 | 0 | 60 | 0 |

APGP: Atmospheric pressure glow discharge plasma
Corona: Corona discharge
LPGP: Low-pressure glow discharge plasma Table 1 shows that as compared with the fluororesin strips treated by the prior art techniques, the surface of the fluororesin strip treated according to the present invention has a small contact angle with water, that is, improved water wettability, which indicates that a high degree of hydrophilic nature has been imparted and that the surface has been well modified for bonding.

The data of percent rubber adhesion indicate that the rubber is firmly bonded to the fluororesin strip treated according to the present invention as compared with the fluororesin strips treated by the prior art techniques, demonstrating that the present invention is effective for integration.

Example 2 & Comparative Examples 5-9

Example 1 and Comparative Example 3 were repeated except that FEP strips were used as fluororesin films under the conditions shown in Table 1 in order to examine the degree of surface treatment by measuring a contact angle of a water droplet. The results are shown in Table 2.

TABLE 2

|  | Example 2 | Comparative Example 5 | Comparative Example 6 | Comparative Example 7 | Comparative Example 8 | Comparative Example 9 |
|---|---|---|---|---|---|---|
| Type of discharge | APGP | LPGP | LPGP | LPGP | LPGP | — |
| Pressure, Torr | 760 | 0.1 | 0.2 | 0.5 | 1.0 | — |
| Frequency, kHz | 5 | $1.356 \times 10^4$ | $1.356 \times 10^4$ | $1.356 \times 10^4$ | $1.356 \times 10^4$ | — |
| Treating time, sec. | 300 | 300 | 300 | 300 | 300 | — |
| Gas | He (99%) | He (99%) | He (99%) | He (99%) | He (99%) | — |
| Contact angle, ° | 32 | 107 | 110 | 103 | 104 | 97 |

APGP: Atmospheric pressure glow discharge plasma
LPGP: Low - pressure glow discharge plasma As is evident from the results of Table 2, a contact angle is extremely improved by the atmospheric pressure glow discharge plasma method, whereas the low-pressure glow discharge plasma method cannot attain a good surface treatment using helium gas.

Example 3 & Comparative Example 10

Figure 6:
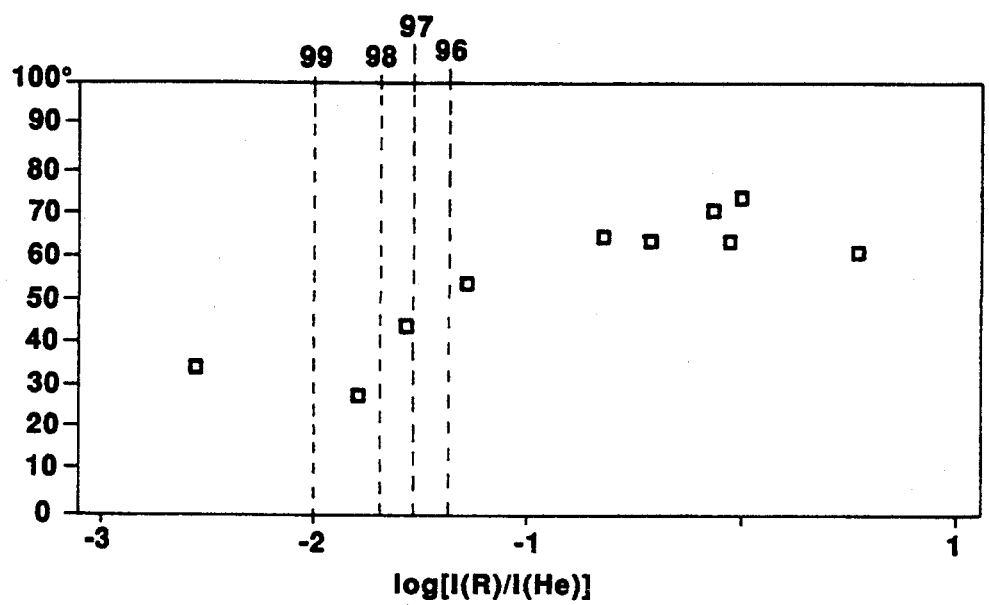
FIG. 6 is a graph showing a relationship between a He gas concentration and a contact angle of a water droplet on a surface-treated ETFE.
Figure 7:
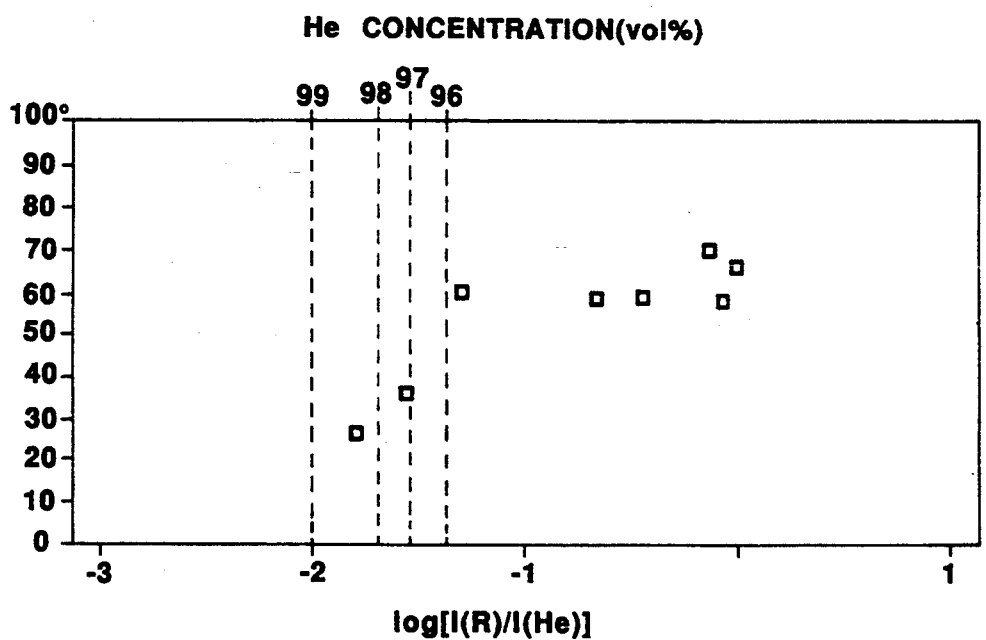
FIG. 7 is a graph showing a relationship between a He gas concentration and a contact angle of a water droplet on a surface-treated PVDF.

Example 1 and Comparative Example 1 were repeated except that ETFE and PVDF strips were treated as fluororesin films respectively under atmospheres having various helium gas concentrations by atmospheric pressure glow discharge plasma discharge method (pressure: 760 Torr, frequency: 5 kHz, treating time: 300 sec.) in order to measure a contact angle of a water droplet. The results of ETFE are shown in FIG. 6 and the results of PVDF are shown in FIG. 7. In these experiments, the remaining gas except helium gas may be $O_2$, $N_2$, $H_2O$, $CO_2$, CO, etc.

In FIGS. 6 and 7, I (He) is an intensity of He gas measured by quadrupole mass spectrometer and I(R) is an intensity of impurity gas measured by quadrupole mass spectrometer.

As is evident from the results of FIGS. 6 and 7, the surface treatment with atmospheric pressure glow discharge plasma in a helium gas atmosphere containing at least 97% by volume of helium gas can give an excellently treated surface.

Example 4

This example examines the compatibility of rubber compositions with adhesives. The rubber compositions tested are rubber composition A in Example 1 based on NBR and the following rubber composition B based on IIR.

| Rubber composition B | Parts by weight |
|---|---|
| IIR (Butyl 268 by Japan Synthetic Rubber K.K.) | 100 |
| Carbon black (N - 660) | 70 |
| Zinc white | 5 |
| Stearic acid | 1 |
| Paraffin oil | 25 |
| Vulcanization promoter 3) | 0.5 |
| Vulcanization promoter 4) | 1 |

-continued

| Rubber composition B | Parts by weight |
|---|---|
| Sulfur | 2 |

3) dibenzothiazyl disulfide (MBTS)
4) tetramethylthiuram disulfide (TMTD)

Fluoropolymer members of the same ETFE resin as in Example 1 were used and surface treated in the same manner as in Example 1.

The adhesives used were
NBR-phenol adhesive (Metalock 968 manufactured by Toyo Chemical Research K.K.),
modified NBR-phenol adhesive,
butyral adhesive,
aminosilane adhesive (methanol dilution by a factor of 50),
butyl adhesive (MEK dilution by a factor of 4), and
urethane adhesive (Desmodur R manufactured by Bayer AG, ethylene chloride dilution by a factor of 3). The adhesives were brush coated to the treated surface of fluororesin strips and air dried. Then rubber pieces were laid on the strips and vulcanized to the strips by heat pressing at 150° C. for 45 minutes for rubber composition A and at 150° C. for 30 minutes for rubber composition B.

The fluororesin/rubber composite samples were subject to a stripping test by stripping the rubber pieces from the fluororesin strips in the same manner as in Example 1. The percent area of rubber remainder on the fluororesin strip after the test was determined and reported as rubber adhesion. The proportion of cohesive failure of rubber was examined in this way.

The results ar shown in Table 3.

TABLE 3

| | Rubber adhesion, % | |
|---|---|---|
| Adhesive | Rubber A | Rubber B |
| NBR - phenol | 100 | 0 |
| Modified NBR phenol | 50 | 0 |
| Butyral | 0 | 0 |
| Aminosilane | 50 | 0 |
| Butyl | 70 | 100 |
| Urethane | 100 | 0 |

As is evident from Table 3, for the fluororesin surfaces modified to be highly hydrophilic, the NBR phenol, modified NBR-phenol, aminosilane, butyl and urethane adhesives are well compatible with the NBR rubber composition, with the NBR-phenol and urethane adhesives being most preferred. The butyl adhesive is well compatible with the IIR rubber composition.

Example 5

Using an internal electrode type atmospheric pressure glow discharge plasma discharging apparatus as shown in FIG. 5, various fluoropolymer-containing sheets reported in Table 5 were surface treated under the conditions reported in Table 4. The sheets both before and after the surface treatment were measured for contact angle with water for comparing their hydrophilic nature before and after the surface treatment.

The results are shown in Table 6.

TABLE 4

| Inert gas | Helium (99%) |
|---|---|
| Gas flow rate | 5.0 l/min. |
| Discharge frequency | 5 kHz |

TABLE 4-continued

| Inert gas | Helium (99%) |
|---|---|
| Treating time | 60 sec. |

TABLE 5

| No. | Fluoropolymer | Abbreviation |
|---|---|---|
| 1 | tetrafluoroethylene - perfluoroalkylvinylether resin | PFA |
| 2 | perfluoroethylene - propylene resin | FEP |
| 3 | polychlorotrifluoroethylene resin | CTFE |
| 4 | tetrafluoroethylene - ethylene resin | ETFE |
| 5 | polyvinylidene fluoride resin | PVDF |
| 6 | polyvinyl fluoride resin | PVF |
| 7 | polyvinylidene fluoride resin/polymethyl methacrylate resin blend | PVDF/PMMA |
| 8 | polyvinylidene fluoride resin/polyvinyl chloride resin blend | PVDF/PVC |

Manufacturers:
1, 2, 3, 4: Daikin Industry K.K.
5: Penwalt Co. (at present, Atochem Co.)
6: E.I. duPont (38 μm thick)
7: Denka K.K. (DX41 film, 40 μm thick)

TABLE 6

| | | Contact angle with water, ° | |
|---|---|---|---|
| No. | Abbreviation | Before treatment | After treatment |
| 1 | PFA | 109.8 | 27.0 |
| 2 | FEP | 111.8 | 28.0 |
| 3 | CTFE | 94.1 | 28.0 |
| 4 | ETFE | 98.8 | 30.6 |
| 5 | PVDF | 92.1 | 32.0 |
| 6 | PVF | 83.5 | 30.4 |
| 7 | PVDF/PMMA | 63.7 | 27.2 |
| 8 | PVDF/PVC | 61.0 | 19.1 |

As is evident from Table 6, atmospheric pressure glow discharge plasma treatment in helium gas can impart a high degree of hydrophilic nature to the surface of fluoropolymer sheets. Differently stated, fluoropolymer sheets can be modified to have a surface readily bondable with metal foils or synthetic resin sheets.

Example 6

Strips of PVDF, ETFE, FEP and PFA were subjected to atmospheric pressure glow discharge plasma treatment as in Example 5 under the same conditions as in Table 4. The strips were bonded to aluminum foil pieces of 0.2 mm thick with a urethane adhesive (NS50/CA25 manufactured by Sanyo Chemicals K.K.). The adhesive was cured by keeping the samples in an oven at 100° C. for 15 minutes. Bonding force against stripping was measured. Similarly, control samples (without plasma treatment) were examined for bonding force.

The results are shown in Table 7.

TABLE 7

| | Bonding force, kgf/cm | |
|---|---|---|
| Fluororesin | No treatment | Atmospheric glow plasma |
| ETFE | 0.00 | 0.43 |
| PVDF | 0.10 | 0.83 |
| FEP | 0.00 | 0.64 |
| PFA | 0.00 | 0.60 |

As is evident from Table 6, atmospheric pressure glow discharge plasma treatment significantly improves the bond between fluororesin sheet and aluminum foil.

There has been described a method for surface treating fluoropolymer members whereby the fluoropolymer members which are otherwise difficultly bondable can be modified to possess a highly hydrophilic, readily bondable surface. Then fluoropolymer members having surface treated can be integrated with other members of metal, rubber or the like through a firm bond, preferably with the aid of adhesive. To fluoropolymer members possessing a highly hydrophilic, readily bondable surface as a result of surface modification, layers of metal or synthetic resin can be laminated and firmly bonded to form weather-resistant composite sheets.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for forming a composite sheet comprising the steps of:
    treating a surface of a fluoropolymer sheet with atmospheric pressure glow discharge plasma at about 760 Torr in a helium gas atmosphere consisting essentially of helium gas by providing the fluoropolymer sheet between electrodes, and
    bonding a layer of metal or synthetic resin to the surface treated fluoropolymer sheet.

2. A method for forming a composite product from a fluoropolymer member comprising the steps of:
    treating a surface of the fluoropolymer member with atmospheric pressure glow discharge plasma at about 760 Torr in a helium gas atmosphere consisting essentially of helium gas by providing the fluoropolymer member between electrodes, and
    joining a second member selected from the group consisting of rubber compositions, resins, metals, ceramics, and semiconductors to the surface treated fluoropolymer member.

3. The method of claim 2 wherein the second member is joined to the fluoropolymer member with an adhesive selected from the group consisting of silane coupling agents, aminosilane coupling agents and mixtures thereof.

4. The method of claim 2 wherein the second member is a rubber composition based on a NBR rubber and is joined to the fluoropolymer member with an adhesive selected from the group consisting of urethane, NBR-phenol, modified NBR-phenol, aminosilane and butyl adhesives.

5. The method of claim 2 wherein the second member is a rubber composition based on a IIR rubber and is joined to the fluoropolymer member with a butyl adhesive.

6. The method according to claim 2, wherein said helium gas atmosphere consists of helium.

7. The method according to claim 2, wherein said fluoropolymer member comprises a fluororesin selected from the group consisting of polytetrafluoroethylene, perfluoroalkoxy fluororesins, tetrafluorinated ethylene-hexafluorinated propylene copolymers, ethylene-tetrafluorinated ethylene copolymers, poly(chlorotrifluoroethylene), polyvinylidene fluoride, and polyvinyl fluoride.

8. The method according to claim 7, wherein said fluoropolymer member further comprises up to 100 parts by weight per 100 parts by weight of said fluroresin of a synthetic resin selected from the group consisting of polyethylene(meth) acrylate copolymers, poly(meth) acrylates, polyvinyl chloride, polyethylene terephthalate, polybutylene terephthalate, polyamides, polyvinyl acetate, polyvinylidene chloride, polycarbonates, poly(4-methyl-1-pentene), poly(cis-1,2-butadiene), acrylonitrile-butadiene-styrene copolymers, and ethylene-propylene copolymers.

9. The method according to claim 2, wherein said fluoropolymer member comprises a fluororubber.

10. A method which comprises:
    treating a surface of a fluoropolymer substrate positioned between electrodes with glow discharge plasma at a pressure of about 760 Torr and in an atmosphere that consists essentially of helium; and
    joining a rubber composition to said treated fluoropolymer substrate.

11. The method according to claim 10, wherein said joining comprises vulcanizing the rubber while in contact with said treated surface of said fluoropolymer substrate.

12. The method according to claim 10, wherein said joining comprises providing an adhesive between said treated fluoropolymer surface and said rubber.

* * * * *